(12) United States Patent
Voets

(10) Patent No.: US 6,461,143 B1
(45) Date of Patent: Oct. 8, 2002

(54) INJECTION MOLD FOR DISC-SHAPED PLASTIC OBJECTS AND MULTIPLE INJECTION MOLDING UNIT

(75) Inventor: Martinus H. J. Voets, Eindhoven (NL)

(73) Assignee: Axxicon Moulds Eindhoven B.V., Son (NL)

(*) Notice: Subject to any disclaimer, the term of this patent is extended or adjusted under 35 U.S.C. 154(b) by 0 days.

(21) Appl. No.: 09/622,668

(22) PCT Filed: Mar. 15, 1999

(86) PCT No.: PCT/NL99/00140

§ 371 (c)(1),
(2), (4) Date: Nov. 9, 2000

(87) PCT Pub. No.: WO99/46108

PCT Pub. Date: Sep. 16, 1999

(30) Foreign Application Priority Data

Mar. 13, 1998 (NL) .............................................. 1008579
Dec. 22, 1998 (NL) .............................................. 1010868

(51) Int. Cl.$^7$ .............................................. B29C 45/23
(52) U.S. Cl. ...................................... 425/564; 425/566
(58) Field of Search ................................ 425/562, 563, 425/564, 565, 566

(56) References Cited

U.S. PATENT DOCUMENTS

| | | |
|---|---|---|
| 2,918,086 A | 12/1959 | Eich |
| 3,642,418 A | 2/1972 | Van Holdt |
| 4,077,756 A | 3/1978 | Meadors |
| 4,391,579 A * | 7/1983 | Morrison ............ 425/564 |
| 4,394,117 A * | 7/1983 | Taylor ............... 425/563 |
| 4,808,106 A | 2/1989 | Van Holdt |
| 5,785,915 A * | 7/1998 | Osuna-Diaz ......... 425/562 |

FOREIGN PATENT DOCUMENTS

| | | |
|---|---|---|
| DE | 32 01 710 | 8/1982 |
| DE | 43 00 336 | 7/1993 |
| EP | 0 051 252 | 5/1982 |
| EP | 0 066 649 | 12/1982 |
| EP | 0 117 510 | 9/1984 |
| EP | 0 546 554 | 6/1993 |
| EP | 0 825 008 | 7/1996 |
| JP | 58-051126 | 3/1983 |
| JP | 61-229520 | 10/1986 |
| JP | 61-272119 | 12/1986 |
| JP | 62-048519 | 3/1987 |
| WO | 92/08597 | 5/1992 |

* cited by examiner

Primary Examiner—Tim Heitbrink
(74) Attorney, Agent, or Firm—Banner & Witcoff, Ltd.

(57) ABSTRACT

Injection mold for manufacturing disc-shaped plastic objects with a central hole, which mold comprises: a first mold part; a second mold part displaceable relative to this first mold part; which two mold parts are displaceable between a closed first position, in which they together partially bound a mold cavity corresponding to the shape of an object for manufacture, and an open second position in which a formed object can be removed; a third mold part which in an active position extends through the mold cavity and in the region of this mold cavity has a shape corresponding to the shape of the central hole, which third mold part is axially displaceable relative to the first and second mold parts between said active position and a retracted rest position; which third mold part bounds with the guide sleeve a channel which is connectable to the injection nozzle of an injection molding device, which channel can be opened and closed by means of a valve consisting of a valve seat which is formed by a part of the inner surface of a guide sleeve widening towards the mold cavity and a valve body which is formed by a widened portion on one end of the third mold part; which valve body can be displaced to the active position of the valve by the pressure of the plastic supplied through the channel and can be displaced to the rest position by a pressure member; and first heating means co-acting with guide sleeve for keeping plastic present in the channel in the plastic state.

20 Claims, 9 Drawing Sheets

INJECTION MOLD FOR DISC-SHAPED PLASTIC OBJECTS AND MULTIPLE INJECTION MOLDING UNIT

BACKGROUND OF THE INVENTION

EP-A-0 566 266 discloses an injection mold for manufacturing disc-shaped plastic objects with a central hole, which mold comprises:

a first mold part;

a second mold part displaceable relative to this first mold part by means of first displacing means;

which two mold parts are displaceable between a closed first position, in which they together partially bound a mold cavity corresponding to the shape of an object for manufacture, and an open second position in which a formed object can be removed;

a third mold part which in the closed position of the first and second mold parts extends through the mold cavity defined thereby and in the region of this mold cavity has a shape corresponding to the shape of the central hole, which third mold part is axially displaceable between a first position, in which it partially forms a boundary of the mold cavity, and a retracted second position by means of second displacing means by means of a guide sleeve forming part of the first mold part;

which third mold part bounds a channel which is connectable on the free outer end to the injection nozzle of an injection molding device and on the other side debouches with an injection inlet in to the region of the mold cavity in the first position of the first and the second mold parts and the first position of the third mold part, and in the second position of the third mold part debouches blind against the inner wall of the guide sleeve; and heating means for keeping plastic present in the channel in the plastic state.

BRIEF DESCRIPTION OF THE INVENTION

It is an object of the invention to improve the prior art injection mold in a number of respects. The invention provides an injection mold for manufacturing disc-shaped plastic objects with a central hole, which mold comprises:

a first mold part;

a second mold part displaceable relative to the first mold part by means of first displacing means;

which two mold parts are displaceable by means of the first displacing means between a closed first position, in which they together partially bound a mold cavity corresponding to the shape of an object for manufacture, and an open second position in which a formed object can be removed;

a third mold part which in an active position extends in the closed position of the first and second mold parts through the mold cavity defined thereby and in the region of this mold cavity has a shape corresponding to the shape of the central hole, which third mold part is axially displaceable relative to the first and second mold parts between said active position in which it forms a partial boundary of the mold cavity and a retracted rest position by means of second displacing means by means of a guide sleeve forming part of the first mold part;

which third mold part bounds with the guide sleeve a channel which is connectable at its free end remote from the mold cavity to the injection nozzle of an injection molding device, which channel can be selectively opened and closed at its end adjacent to the mold cavity by means of a valve consisting of a valve seat which is formed by a part of the inner surface of the guide sleeve widening towards the mold cavity and a valve body which is formed by a widened portion on the relevant end of the third mold part such that in the open active situation of the valve the channel debouches in annular manner into the mold cavity and in the closed rest position of the valve the channel is separated from the mold cavity;

which valve body can be displaced to the active position of the valve by the pressure of the plastic supplied through the channel and can be displaced to the rest position by a pressure member extending through the second mold part, wherein the activity of the pressure member and the supply of plastic never occur simultaneously; and first heating means co-acting with the guide sleeve for keeping plastic present in the channel in the plastic state.

In order to combine a reliable closure of the valve with a low pressure on valve body and valve seat in the contact surfaces, an embodiment is recommended in which the valve body has substantially the same shape as the valve seat.

Use can be made of an annular ring of passage openings with which the channel debouches in the mold cavity. Preferably, the channel debouches in the mold cavity via an annular opening. In this preferred embodiment an inflow is ensured which is as homogenous as possible.

In a specific embodiment at least the outer surface of the valve body has a hardness which corresponds at least to that of hard metal. For example, at least the outer surface may consist of ceramic material.

In a specific embodiment the third mold part is carried slidably by the guide sleeve by means of a number of guide protrusions present on the guide sleeve and/or on the third mold part. The guide protrusions can be arranged as desired on the inner surface of the guide sleeve or on the outer surface of the third mold part, or a combination thereof. These guide protrusions can advantageously be placed in angularly equidistant manner. For reasons of production technique, it is recommended to form the guide protrusions, for instance in the form of ribs, on the third mold part. The guide protrusions must then have a certain dimension in an axial direction or use is made of separate protrusions located at mutual axial distance. A reliable axial guiding is hereby realized. The guide protrusions preferably have such a large active surface area in common with the surface co-acting therewith that the pressure between the relevant surfaces is very small. This enhances the lifespan and low friction.

A particular embodiment has the special feature that the third mold part is carried slidably by the guide sleeve by means of a number of guide ribs present on the third mold part which extend in angularly equidistant manner and each have a helical shape. The part-flows mutually separated by the guiding ribs form seams which connect poorly to each other and are distinguishable in the final manufactured product. The helical ribs have the effect that the part-flows mix well after being combined. This phenomenon, also known as "cold flow" is thus essentially prevented.

For optical information carriers such as CD-audio, CD-ROM, CD-R, CD-i, DVD and the like, it is of the greatest importance that the optical quality of the information carriers, usually consisting of polycarbonate, meets the very highest set standards. In order to realize this objective the mold according to the invention preferably comprises first cooling means acting in the center zone of the mold cavity for cooling plastic flowing into the mold cavity, which center zone extends over an area with a diameter of (0.30 0.15) times the diameter of the mold cavity. A substantial quality improvement can be realized by thus tempering the inflowing plastic.

According to another aspect of the invention, when the valve body has the same shape as the valve seat and the channel debouches via an annular opening into the mold cavity, the mold according to the invention can have a conical shape. In one embodiment, the top angle of the conical shape has a value of $(20\pm5)°$.

According to another aspect of the invention, the pressure member is a pressure cylinder which is provided with second cooling means.

In order to allow the above described guide protrusions to move with the least possible friction over the surface co-acting therewith, the guide protrusions may co-act with the adjacent surface by means of a friction-reducing coating, for instance TiN, DLC (diamond-like carbon). Such a coating must be heat-resistant and wear-resistant.

According to yet another aspect of the invention, the coating is applied to all surfaces of the channel and has anti-stick properties relative to the plastic flow-past, for instance TiN, DLC (diamond-like carbon).

In a specific embodiment, the valve body is releasably connected to the rest of the third mold part and consists of a material with poor heat conduction, for instance a ceramic material. In this case, the valve body, which is subject to erosion and ageing by pressure, can be replaced as desired. The low thermal conduction through the valve body also prevents formation of undesired thermal couplings.

In order to keep the operation of a mold as manageable as possible, the heating means are separated from the first cooling means. Specifically, an annular thermal insulator may be arranged between the guide sleeve and the first cooling means.

The invention further provides an injection molding unit comprising at least two injection molds for manufacturing disc-shaped plastic objects with a central hole, each of which molds comprises:

a first mold part;

a second mold part displaceable relative to this first mold part by means of first displacing means;

which two mold parts are displaceable by means of the first displacing means between a closed first position, in which they together partially bound a mold cavity corresponding to the shape of an object for manufacture, and an open second position in which a formed object can be removed;

a third mold part which in an active position extends in the closed position of the first and second mold parts through the mold cavity defined thereby and in the region of this mold cavity has a shape corresponding to the shape of the central hole, which third mold part is axially displaceable relative to the first and the second mold part between said active position in which it forms a partial boundary of the mold cavity and a retracted rest position by means of second displacing means by means of a guide sleeve forming part of the first mold part; which third mold part together with the guide sleeve bounds a channel which is connectable at its free end remote from the mold cavity to the injection nozzle of an injection molding device, which channel can be selectively opened and closed at its end adjacent to the mold cavity by means of a valve consisting of a valve seat which is formed by a part of the inner surface of the guide sleeve widening towards the mold cavity and a valve body which is formed by a widened portion on the relevant end of the third mold part such that in the open active situation of the valve the channel debouches in annular manner into the mold cavity and in the closed rest position of the valve the channel is separated from the mold cavity;

which valve body can be displaced to the active position of the valve by the pressure of the plastic supplied through the channel and can be displaced to the rest position by a pressure member extending through the second mold. part, wherein the activity of the pressure member and the supply of plastic never occur simultaneously; and first heating means co-acting with the guide sleeve for keeping plastic present in the channel in plastic state.

BRIEF DESCRIPTION OF THE DRAWINGS

The invention will now be elucidated with reference to the annexed drawings.

In the drawings.

DETAILED DESCRIPTION OF THE INVENTION

FIGS. 1, 2, 4, 5, 6, 7 and 8 show an injection mold 1 for manufacturing disc-shaped plastic objects with a central hole. The mold comprises a first mold part 2, a second mold part 3 displaceable relative to this first mold part 2 by means of generally known first displacing means (not shown), which two mold parts 2, 3 are displaceable by means of first displacing means between a closed first position shown in FIGS. 1, 2, 5, 6, 7. The parts are bound together with a ring 5, a mold cavity 6 corresponding to the shape of an object for manufacture, and an open second position designated 7 in which a formed object 8 can be taken out. A third mold part 4 (see also FIG. 3) which in an active position extends in the closed position of the first and second mold parts 2, 3 as according to FIGS. 1, 2, 5, 6, 7 through the mold cavity 6 defined thereby and in the region of this mold cavity 6 has a shape corresponding to the shape of the central hole 9 of object 8, which third mold part 4 is axially displaceable with the first and second mold parts 2, 3 between said active position in which it forms a partial boundary of mold cavity 6 and a retracted rest position as drawn in FIGS. 4, 5, 7, 8 by means of second displacing means described below by means of a guide sleeve 10 forming part of first mold part 2.

The third mold part 4 bounds with guide sleeve 10 a channel 11 which is connectable at its free end 12 remote from mold cavity 6 to injection nozzle 13 of an injection molding device 14, which channel 11 can be selectively opened and closed at its end 15 adjacent to the mold cavity by means of a valve consisting of a valve seat which is formed by a part 16 of inner surface 17, 35 of guide sleeve 10 widening towards mold cavity 6 and a valve body which is formed by a widened portion (depicted by protrusion 19) of third mold part 4 such that in the open active situation of valve 16, 18 the channel 11 debouches in annular manner into mold cavity 6 and in the closed rest position of valve 16, 18, the channel 11 is separated from mold cavity 6; which valve body 18 can be displaced to the active position of the valve (FIG. 6) by the pressure of the plastic 20 supplied through channel 11 and can be displaced to the rest position by a pressure member 21 extending through second mold part 3, wherein the activity of pressure member 21 and the supply of plastic 20 never occur simultaneously; and first heating means 122 and second heating means 123 co-acting with guide sleeve 10 for keeping plastic 20 present in channel 11 in plastic state. The pressure of the plastic fed through the channel and the pressure member thus form the second displacing means.

An annular constriction 37 serves as stop for mold part 4.

As shown in the figures, valve body 18 can have substantially the same shape as valve seat 16. The drawings show that the shape in question is a conical form with a top angle of about 20. With the described structure the channel 11 debouches in the region of valve 16, 18 into mold cavity 6 via an annular opening, at least in the active position shown in FIG. 6.

Figure 3:
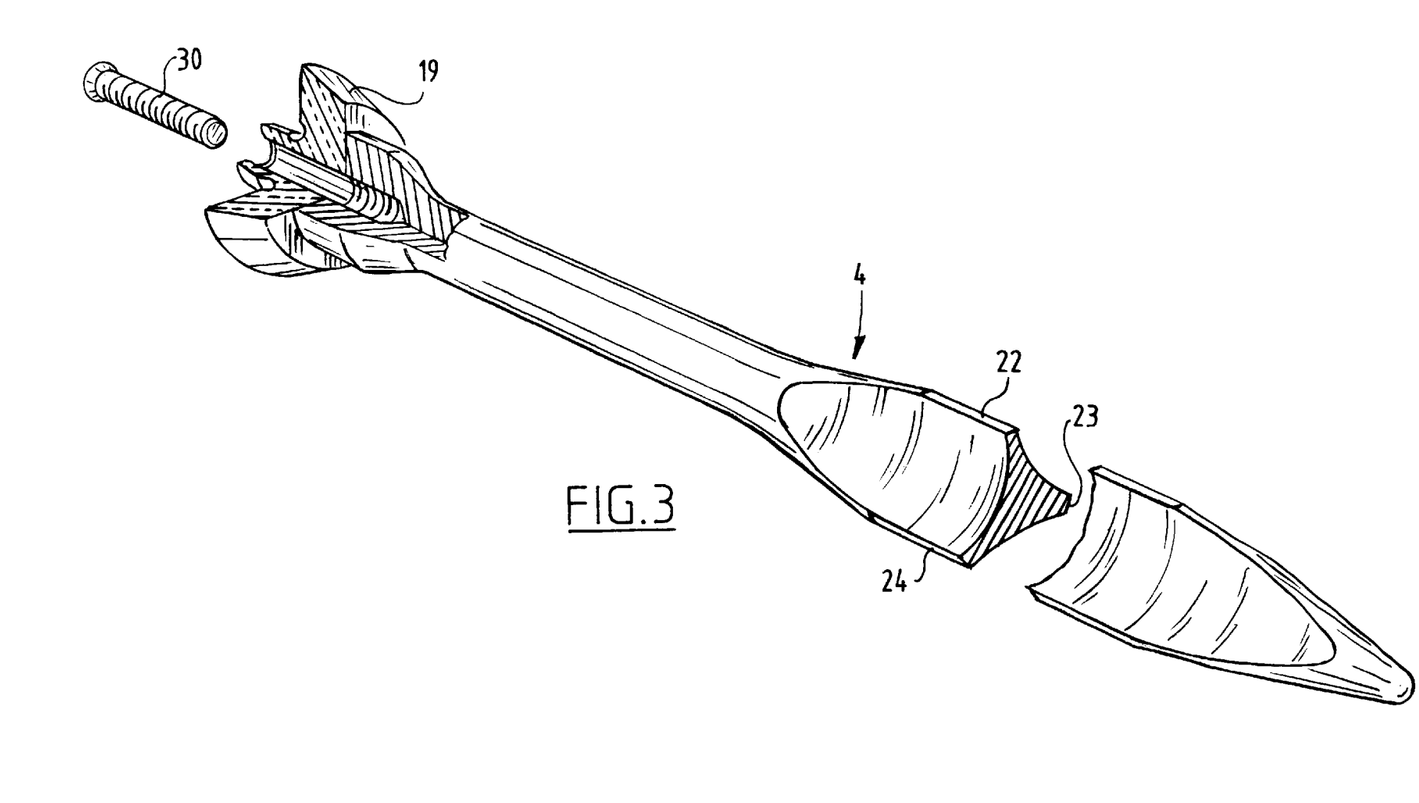
FIG. 3 shows a partly broken-away perspective view of the third mold part.

The third mold part 4 has the shape of a torpedo, as shown clearly in FIG. 3, and has a generally elongate shape with three guide ribs 22, 23, 24, which are slidable over inner surface 17. Because ribs 22, 23, 24 extend over a substantial axial distance and fit with little clearance inside said cylindrical surface 17, the third mold part 4 is carried in easily slidable manner without substantial radial variation.

Cooling means are selectively active in the center zone of mold cavity 6. These consist of a cooling element 25 with cooling channel 26 formed integrally with first mold part 2 or separated therefrom in accordance with the annexed drawings. The front surface 27 of element 25 lies precisely in the same plane as front surface 28 of mold part 2. The effect of the operation of these cooling means 25, 26 is that in the situation according to FIG. 6 plastic flowing into mold cavity 6 is cooled, which is found to result in a greatly improved optical quality of the formed disc-shaped objects, this being particularly important in the case of transparent disc-shaped information carriers.

Pressure cylinder 21 can be thermally coupled to a cooling channel 29.

In the present embodiment all surfaces of third mold part 4 and of channel 11 suitable for this purpose are provided with a coating which has anti-stick properties in respect of the plastic 20 flowing past, is heat-resistant, wear-resistant and reduces the friction between guide ribs 22, 23, 24 and surface 17.

An example of such a coating is titanium nitride (TiN), diamondlike carbon (DLC) or the like.

The protrusion 19 serving as valve body is connected in the manner shown particularly clearly in FIG. 3 to the rest of the third mold part 4 by means of a screw 30. The valve body can thus be replaced by another valve body and can moreover consist of a different material. A suitable material is a poor heat conductor, for instance a ceramic material; The fact that valve body 18 is exchangeable and connected releasably to the rest of the mold part 4 has the advantage that it can be replaced in the case of wear and can moreover be manufactured from a relatively expensive material without this substantially increasing the total cost of mold part 4, 18.

Guide sleeve 10 is connected to cooling element 25 via a thermally insulating ring 31. Heating element 122 is thus thermally separated from cooling element 25. Hereby is realized in reliable manner that the plastic present in channel 11 is kept in the heated plastic state while the plastic is cooled as it flows into mold cavity 6.

Figure 4:
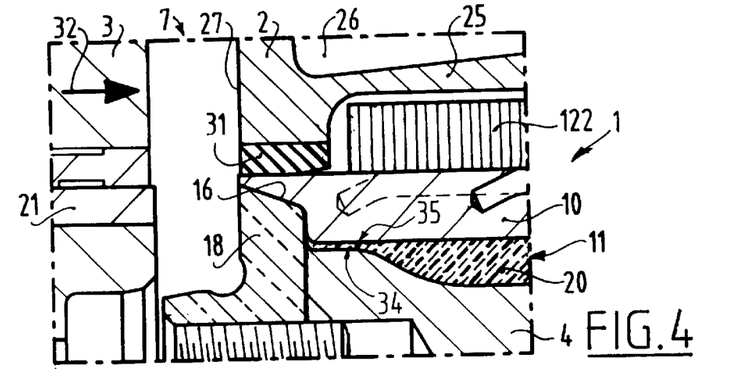
FIGS. 4, 5, 6, 7 and 8 show details of the mold on enlarged scale in respective operative positions.

In the situation of FIG. 4 the mold 1 is placed in the closed position by displacing second mold part 3 as according to arrow 32. Valve 16, 18 is closed and the plastic 20 present in channel 11 is pressureless.

Figure 5:
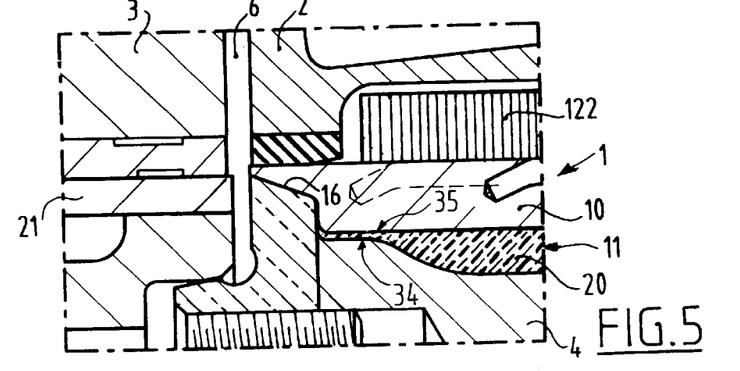

FIG. 5 shows the situation in which the mold is closed and mold cavity 6 is formed.

Figure 6:
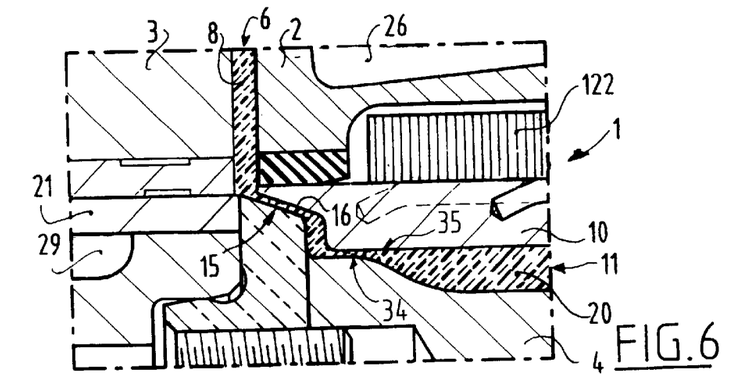

FIG. 6 shows the following phase in which the plastic 20 in channel 11 is placed under pressure, whereby valve body 18 is displaced to the situation shown in FIG. 6 in which valve 16, 18 is opened and the plastic is injected via an annular injection zone. In this situation cooling liquid flows through cooling channel 26 for cooling of front surface 27. A certain after-pressure is also exerted after injection. During this phase cooling liquid also flows through cooling channel 29.

Figure 7:
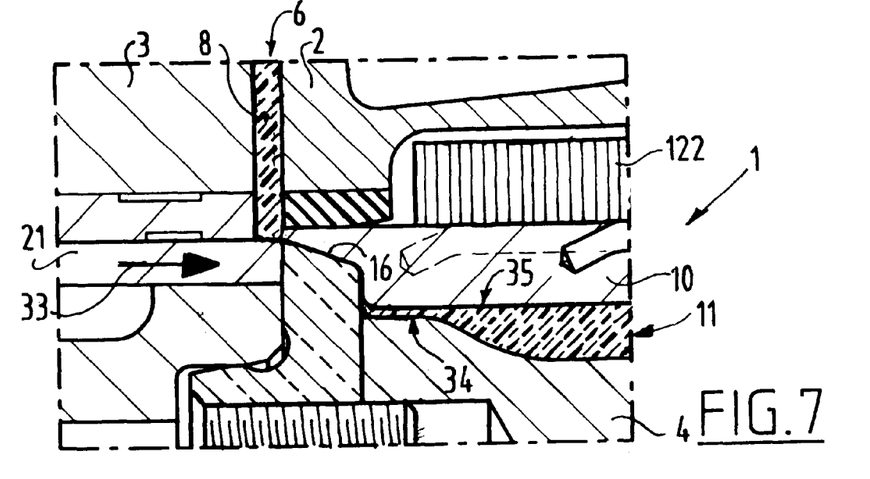

Injection is hereby completed. As shown in FIG. 7, pressure cylinder 21 is displaced to the right as according to arrow 33, whereby valve body 18 is pressed against the valve seat and the valve thereby closed once again. It is noted that under all conditions there is a cylindrical outer surface part 34 of mold part 4 which co-acts with the cylindrical inner surface 17, 35 of channel 11. These two surfaces define the smallest through-flow opening under all conditions. In the situation according to FIG. 6 this cylindrical through-flow opening connects via an annular radial passage onto the conical passage defined by valve 16, 18. After the situation shown in FIG. 7 has been reached the disc-shaped product 8 is finished and the mold can be opened.

Figure 8:
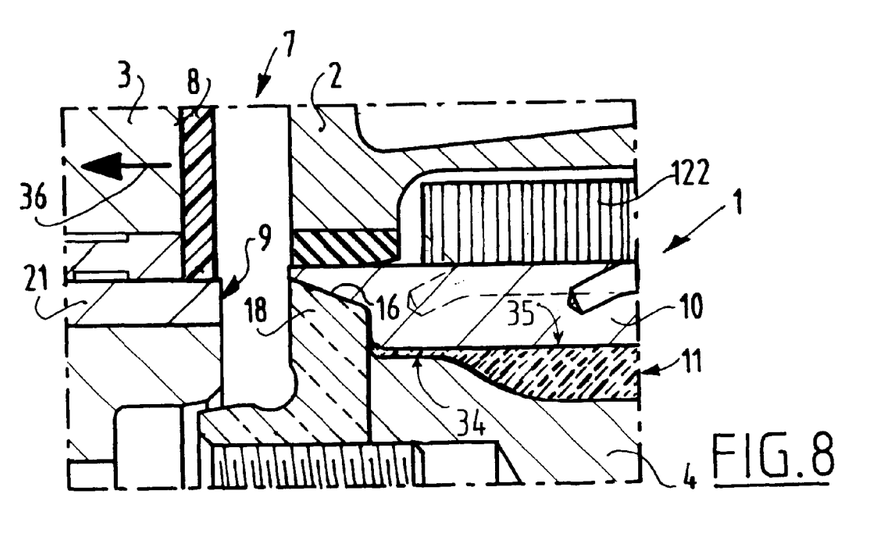

FIG. 8 shows that for this purpose mold part 3 is displaced to the left as according to arrow 36 such that disc 8 can be taken out.

It is noted that a so-called stamper has been omitted from the drawing, i. e. a disc-shaped insert in the mold cavity in which the information for transferring onto the information carrier is displayed in negative form.

After the situation shown in FIG. 8 has been reached the manufacturing cycle is ended and the device returns to the situation shown in FIG. 5 for the manufacture of a subsequent object.

Figure 9:
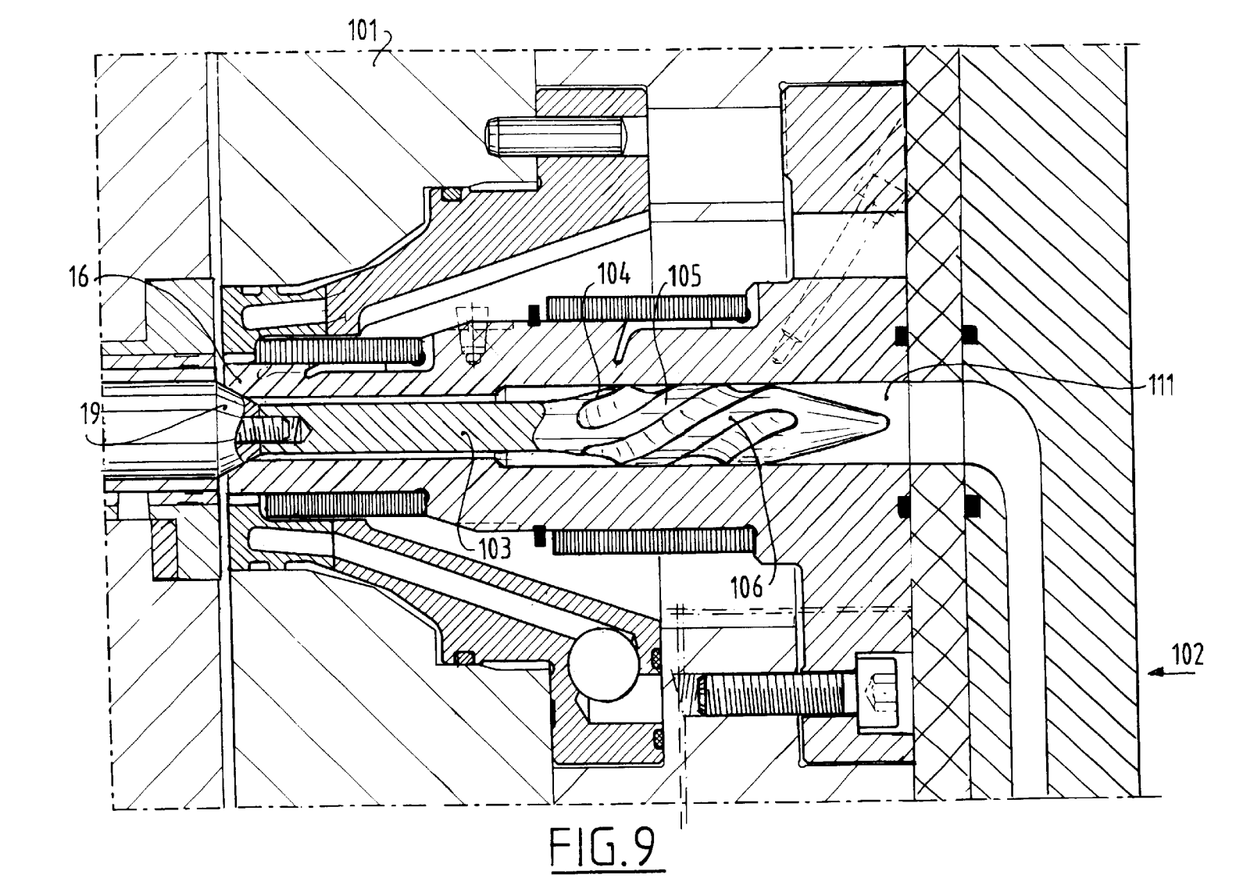
FIG. 9 is a cross-section through an injection mold in another embodiment.
Figure 11:
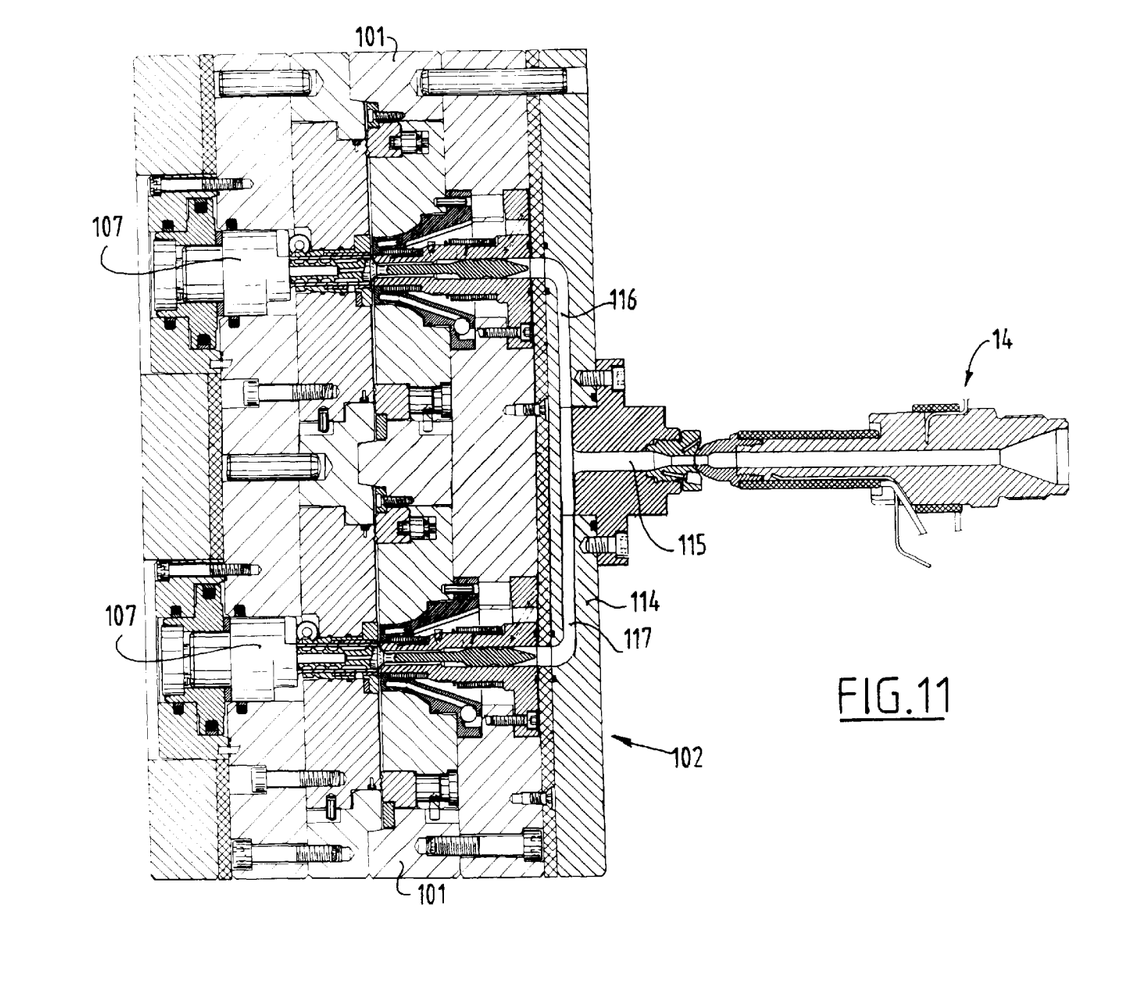
FIG. 11 shows in cross-section a dual injection molding unit with two molds of the type shown in FIG. 9.

FIG. 9 shows a part of an injection mold 101 which forms part of the dual injection molding unit 102 shown in FIG. 11.

Figure 2:
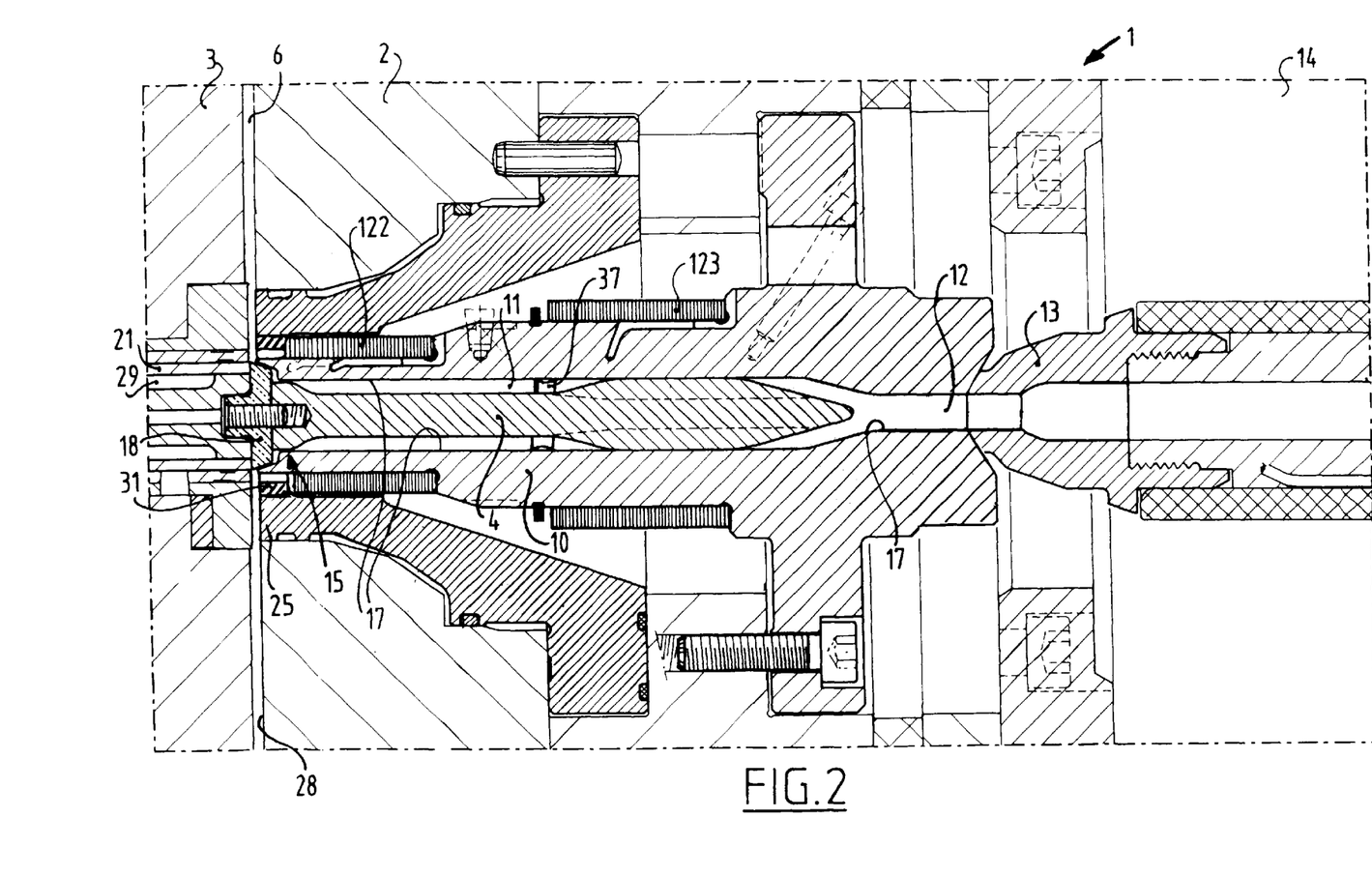
FIG. 2 shows a detail of a mold according to FIG. 1 on enlarged scale.

Mold 101 largely corresponds with mold 1 according to FIG. 2. An essential difference is the form of the helical guide ribs described below.

It is pointed out with reference to FIG. 3 that guide ribs 22, 23, 24 are substantially straight in the embodiment shown therein. Mold 101 of FIG. 9 has a third mold part 103 with guide ribs 104, 105, 106 which, as shown, have a generally helical shape, are in angularly equidistant arrangement and have identical shapes.

In respect of mold 101 reference is otherwise made to mold 1 according to FIG. 2.

Figure 10:
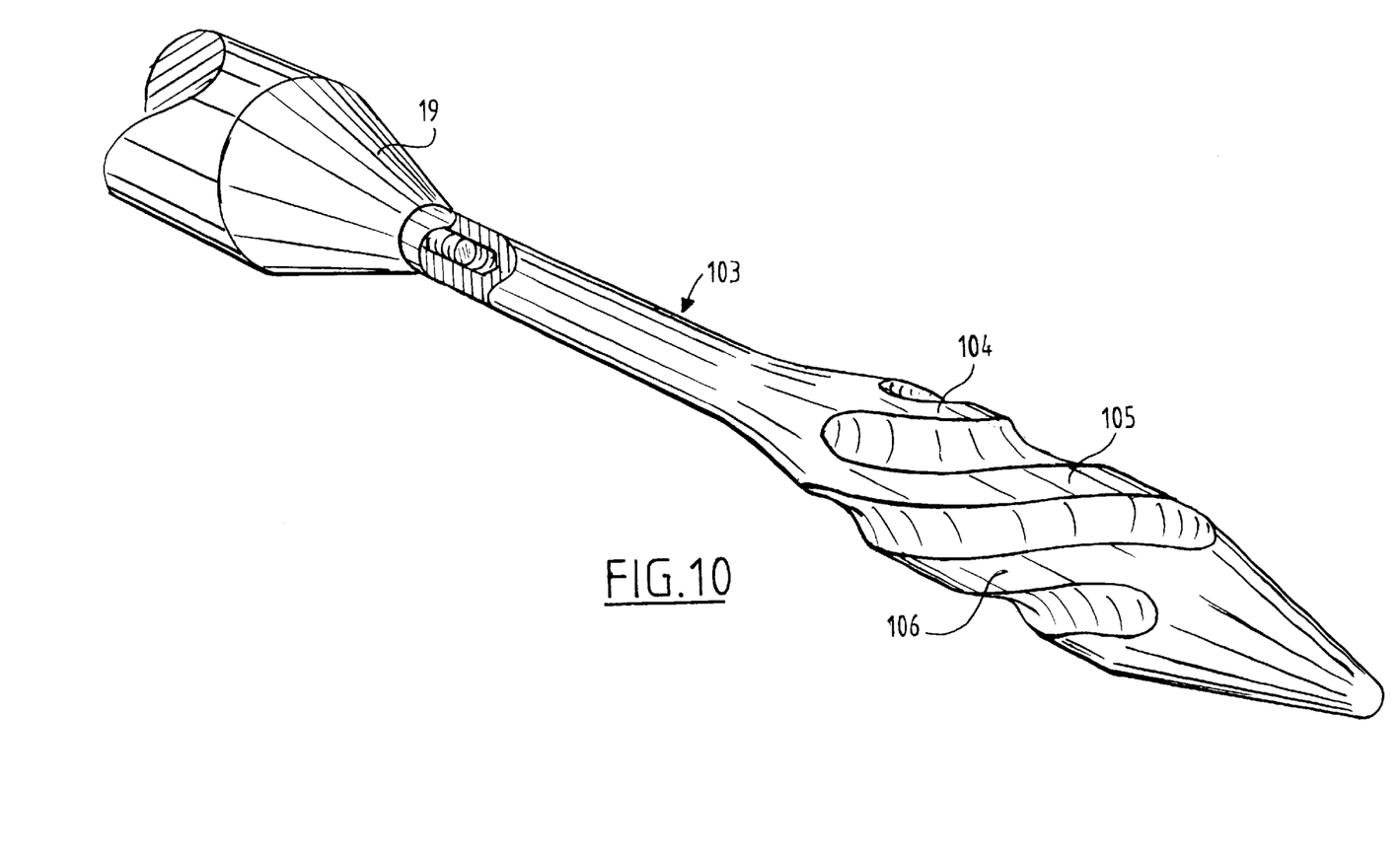
FIG. 10 shows the third mold part of FIG. 9 in partly broken-away perspective view.

FIG. 10 shows the general torpedo-like third mold part 103.

The conical widening of protrusion 19 of third mold part 4 according to FIG. 3 is embodied in slightly different manner than in third mold part 103 according to FIG. 10. This is however not important either functionally or for a good understanding of the invention.

FIG. 11 shows that the injection molding unit 102 comprises two molds of the type according to FIG. 9. These two molds are therefore designated with the same reference numeral, i. e. 101. Attention is drawn to the fact that each of the two molds comprises a pneumatic pusher unit 107 for urging third mold part 103 to a closed position as shown in FIG. 9 after the forming of a plastic object. In this position the conical widened portion of protrusion 19 closes sealingly in the manner of a valve body against the correspondingly formed conical valve seat 16. For the sake of conciseness reference is otherwise made to FIGS. 2, 4, 5, 6, 7 and 8 for the operation of mold 101.

Figure 12:
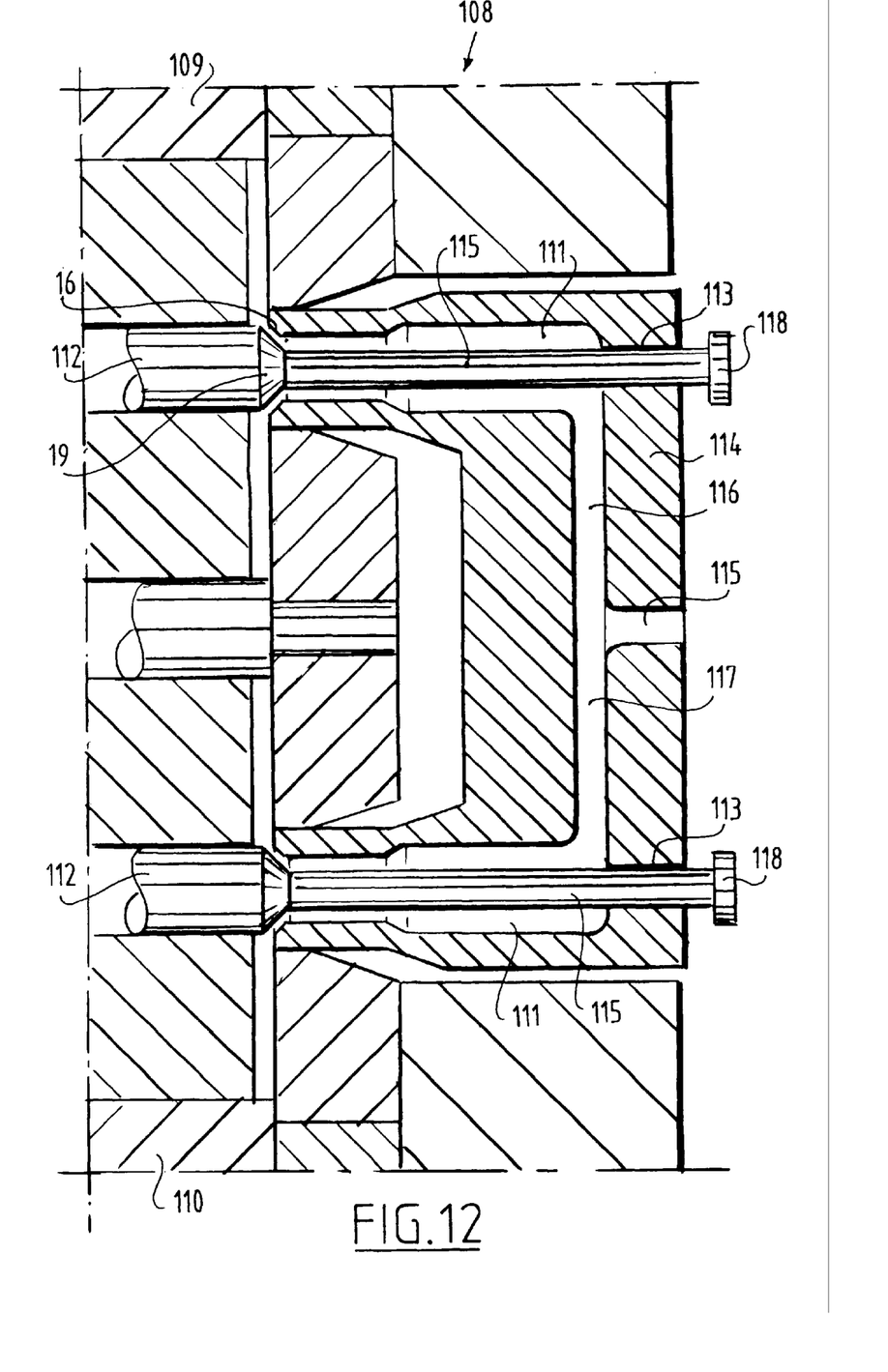
FIG. 12 shows a dual injection mold in another embodiment.

Finally, FIG. 12 shows a dual injection molding unit 108 with two injection molds 109, 110 in an embodiment other than that shown in FIG. 11 with reference to unit 102.

In injection molding unit 102 each of the molds 101 is provided with a third mold part 103 as according to FIG. 10. This mold part is slidingly shiftable in channel 111. In the embodiment according to FIG. 12 the third mold part 112 is likewise axially shiftable but is guided slidably in the double hot-runner 114 via a continuous hole 113 by means of a guide stem 115 forming part of third mold part 112.

Figure 1:
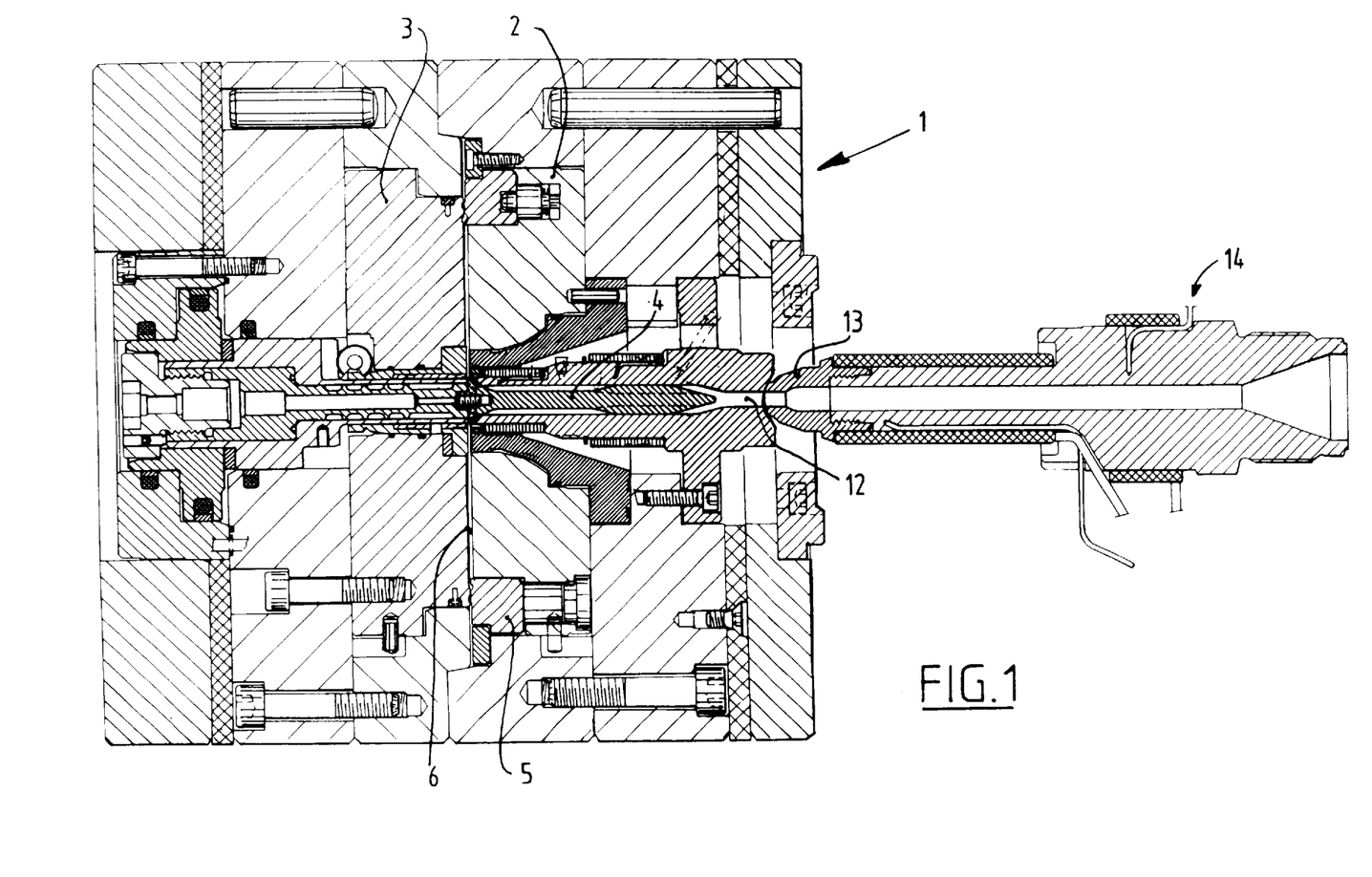
FIG. 1 shows a longitudinal section through a mold according to the invention which is connected to the injection nozzle of an injection molding device.

The multiple hot-runner 114 connects with its inlet channel 115 in the same manner as shown in FIG. 1 onto a plastic-plasticizing and injecting unit of a per se known type. Inlet channel 115 branches into two channels 116, 117 respectively which each supply a part-flow of plastic to the respective molds 101, 101 respectively 109, 110.

In respect of the embodiments according to FIGS. 11 and 12 respectively it is noted that the advantages in the embodiment of FIG. 12 may lie in the fact that the plastic flow in the direction of valve 16, 19 is influenced less and has more the character of a cylindrical jacket-like flow. A widened portion 118 acting as stop can further be positioned in very simple manner outside mold 109, 110. A drawback of the structure of FIG. 12 may be that the hot-runner is not fully closed, as is very much the case in the embodiment according to FIGS. 1, 2, 9, and that plastic leakage can therefore occur as a result of the very high injection pressures.

The invention is not limited to the described embodiments. Specific aspects can for instance be applied separately or also in combination at the choice of a designer.

I claim:

1. Injection mold for manufacturing disc-shaped plastic objects with a central hole, which mold comprises:
    a first mold part;
    a second mold part displaceable relative to this first mold part by means of first displacing means;
    which two mold parts are displaceable by means of the first displacing means between a closed first position, in which they together partially bound a mold cavity corresponding to the shape of an object for manufacture, and an open second position in which a formed object can be removed;
    a third mold part which in an active position extends in the closed position of the first and second mold parts through the mold cavity defined thereby and in the region of this mold cavity has a shape corresponding to the shape of the central hole, which third mold part is axially displaceable relative to the first and second mold parts between said active position in which it forms a partial boundary of the mold cavity and a retracted rest position by means of second displacing means by means of a guide sleeve forming part of the first mold part;
    which third mold part bounds with the guide sleeve a channel which is connectable at its free end remote from the mold cavity to the injection nozzle of an injection molding device,
    which channel can be selectively opened and closed at its end adjacent to the mold cavity by means of a valve consisting of a valve seat which is formed by a part of the inner surface of the guide sleeve widening towards the mold cavity and a valve body which is formed by a widened portion on one end of the third mold part such that in the open active situation of the valve the channel debouches in annular manner into the mold cavity and in the closed rest position of the valve the channel is separated from the mold cavity;
    which valve body can be displaced to the active position of the valve by the pressure of the plastic supplied through the channel and can be displaced to the rest position by a pressure member extending through the second mold part, wherein the activity of the pressure member and the supply of plastic never occur simultaneously; and
    first heating means co-acting with the guide sleeve for keeping plastic present in the channel in the plastic state,
    wherein the heating means are separated from the first cooling means by an annular thermal insulator arranged between the guide sleeve and the first cooling means.

2. Injection mold as claimed in claim 1, wherein the valve body has substantially the same shape as the valve seat.

3. Injection mold as claimed in claim 1, wherein the channel debouches in the mold cavity via an annular opening.

4. Injection mold as claimed in claim 1, wherein at least the outer surface of my the valve body has a hardness which corresponds at least to that of hard metal.

5. Injection mold as claimed in claim 4, wherein at least said outer surface consists of ceramic material.

6. Injection mold as claimed in claim 1, wherein the third mold part is carried slidably by the guide sleeve by means of a number of guide protrusions present on the guide sleeve, the third mold part, or both.

7. Injection mold as claimed in claim 1, wherein the third mold part is carried slidably by the guide sleeve by means of a number of guide ribs present on the third mold part which extend in angularly equidistant manner and each have a helical shape.

8. Injection mold as claimed in claim 1, comprising first cooling means acting in the centre zone of the mold cavity for cooling plastic flowing into the mold cavity, which centre zone extends over an area with a diameter of 0.30±0.15 times the diameter of the mold cavity.

9. Injection mold as claimed in claim 2, wherein the relevant shape is a conical shape.

10. Injection mold as claimed in claim 8, wherein the top angle of the conical shape has a value of 20±5°.

11. Injection mold as claimed in claim 1, wherein the pressure member is a pressure cylinder provided with second cooling means.

12. Injection mold as claimed in claim 6, wherein the guide protrusions co-act with the adjacent surface by means of a friction-reducing coating.

13. Injection mold as claimed in claim 12, wherein the friction-reducing coating is applied to all surfaces of the channel and has anti-stick properties relative to the plastic flow-past.

14. Injection mold as claimed in claim 1, wherein the valve body is connected for optional release to the rest of the third mold part and consists of a material with poor heat conduction.

15. Injection mold as claimed in claim 1, wherein the heating means are separated from the first cooling means.

16. Injection mold as claimed in claim 15, wherein an annular thermal insulator is arranged between the guide sleeve and the first cooling means.

17. Injection molding unit comprising at least two injection molds for manufacturing disc-shaped plastic objects with a central hole, each mold comprising:

a first mold part;

a second mold part displaceable relative to this first mold part by means of first displacing means;

which two mold parts are displaceable by means of the first displacing means between a closed first position, in which they together partially bound a mold cavity corresponding to the shape of an object for manufacture, and an open second position in which a formed object can be removed;

a third mold part which in an active position extends in the closed position of the first and second mold parts through the mold cavity defined thereby and in the region of this mold cavity has a shape corresponding to the shape of the central hole, which third mold part is axially displaceable relative to the first and the second mold parts between said active position in which it forms a partial boundary of the mold cavity and a retracted rest position by means of second displacing means by means of a guide sleeve forming part of the first mold part;

which third mold part together with the guide sleeve bounds a channel which is connectable at its free end remote from the mold cavity to the injection nozzle of an injection molding device, which channel can be selectively opened and closed at its end adjacent to the mold cavity by means of a valve consisting of a valve seat which is formed by a part of the inner surface of the guide sleeve widening towards the mold cavity and a valve body which is formed by a widened portion on one end of the third mold part such that in the open active situation of the valve the channel debouches in annular manner into the mold cavity and in the closed rest position of the valve the channel is separated from the mold cavity;

which valve body can be displaced to the active position of the valve by the pressure of the plastic supplied through the channel and can be displaced to the rest position by a pressure member extending through the second mold part, wherein the activity of the pressure member and the supply of plastic never occur simultaneously; and first heating means co-acting with the guide sleeve for keeping plastic present in the channel in plastic state.

18. Injection mold as claimed in claim 3, wherein the relevant shape is a conical shape.

19. Injection mold as claimed in claim 12 wherein the friction-reducing coating is TiN or diamond-like carbon.

20. Injection mold as claimed in claim 13 wherein the friction-reducing coating is TiN or diamond-like carbon.

* * * * *

UNITED STATES PATENT AND TRADEMARK OFFICE
CERTIFICATE OF CORRECTION

PATENT NO. : 6,461,143 B1
DATED : October 8, 2002
INVENTOR(S) : Martinus H. J. Voets It is certified that error appears in the above-identified patent and that said Letters Patent is hereby corrected as shown below:

Column 8,
Line 40, "my" has been deleted

Signed and Sealed this

Eleventh Day of March, 2003

JAMES E. ROGAN
*Director of the United States Patent and Trademark Office*